United States Patent Office 2,831,545
Patented Apr. 22, 1958

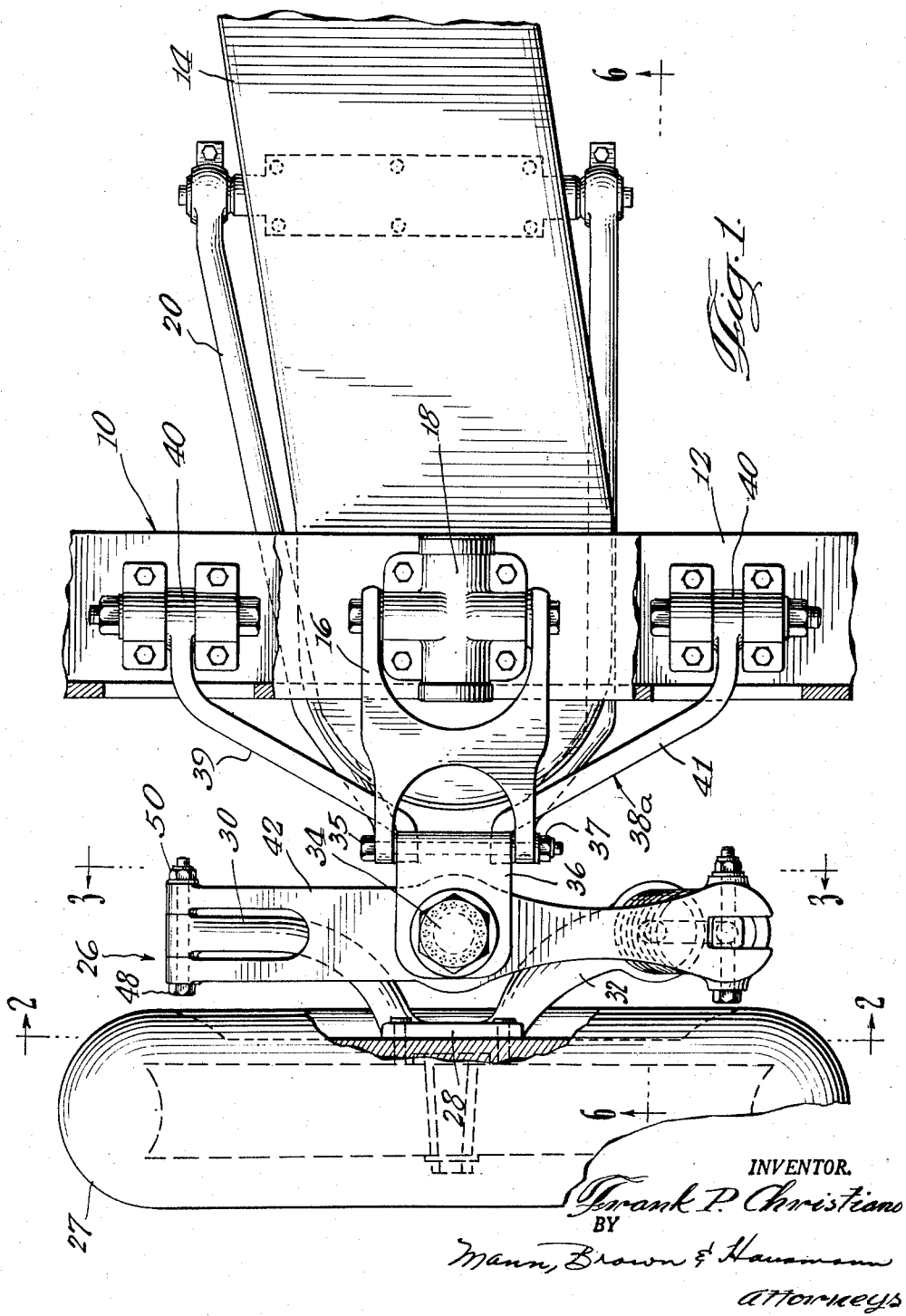

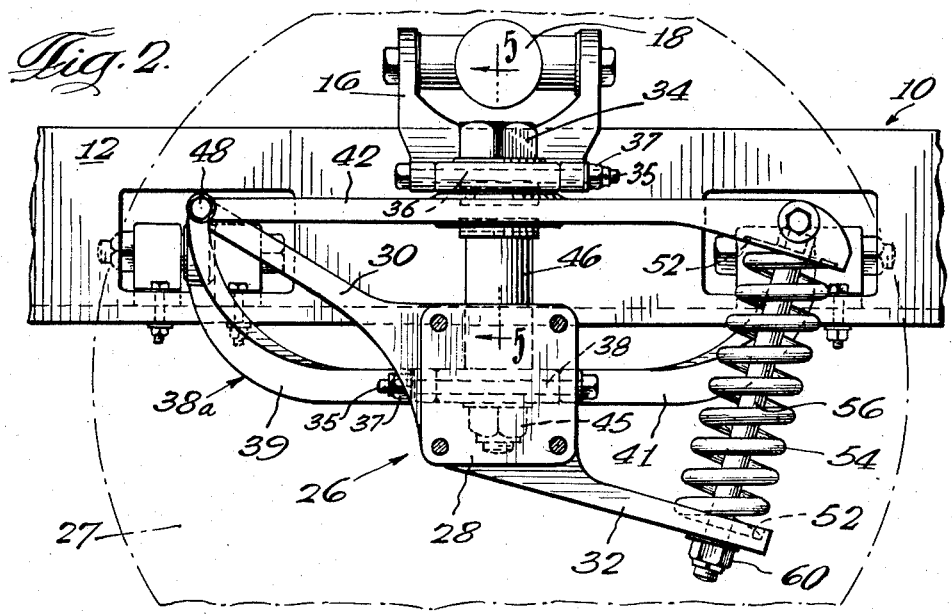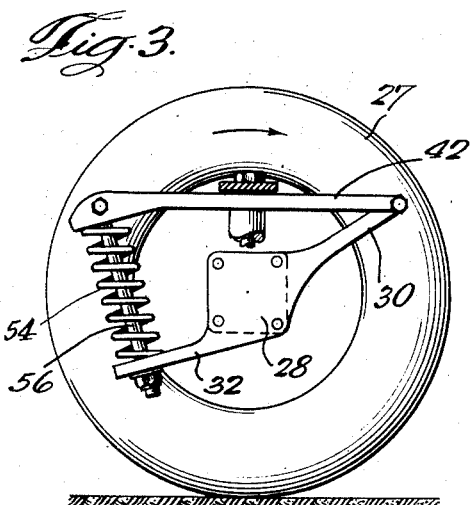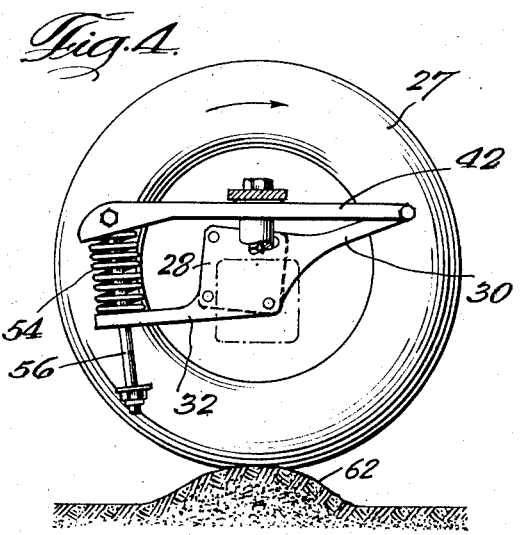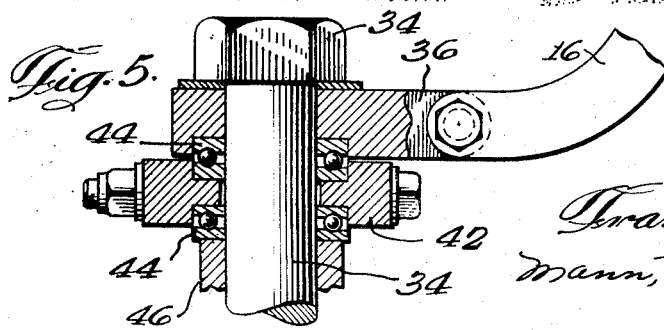

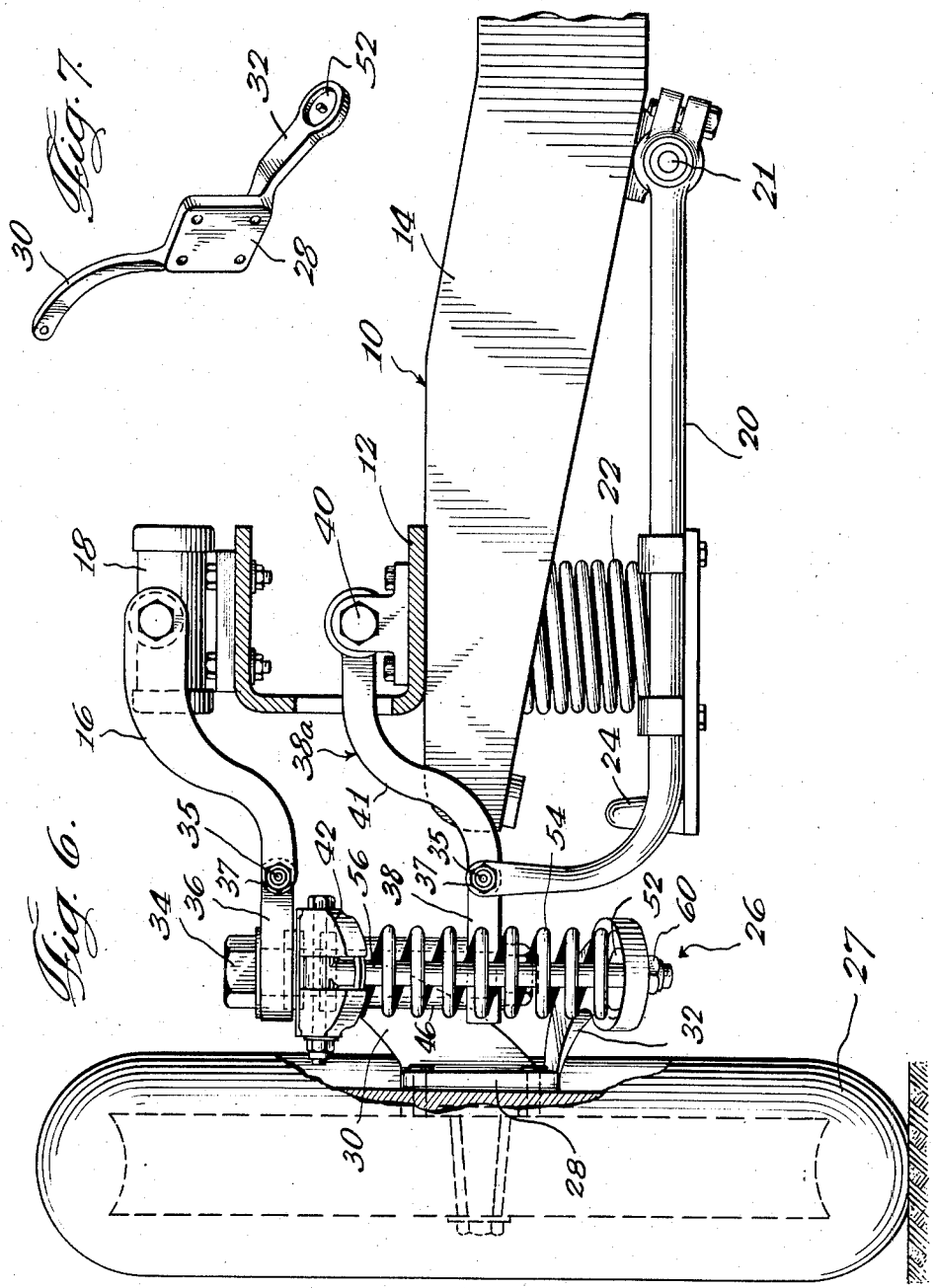

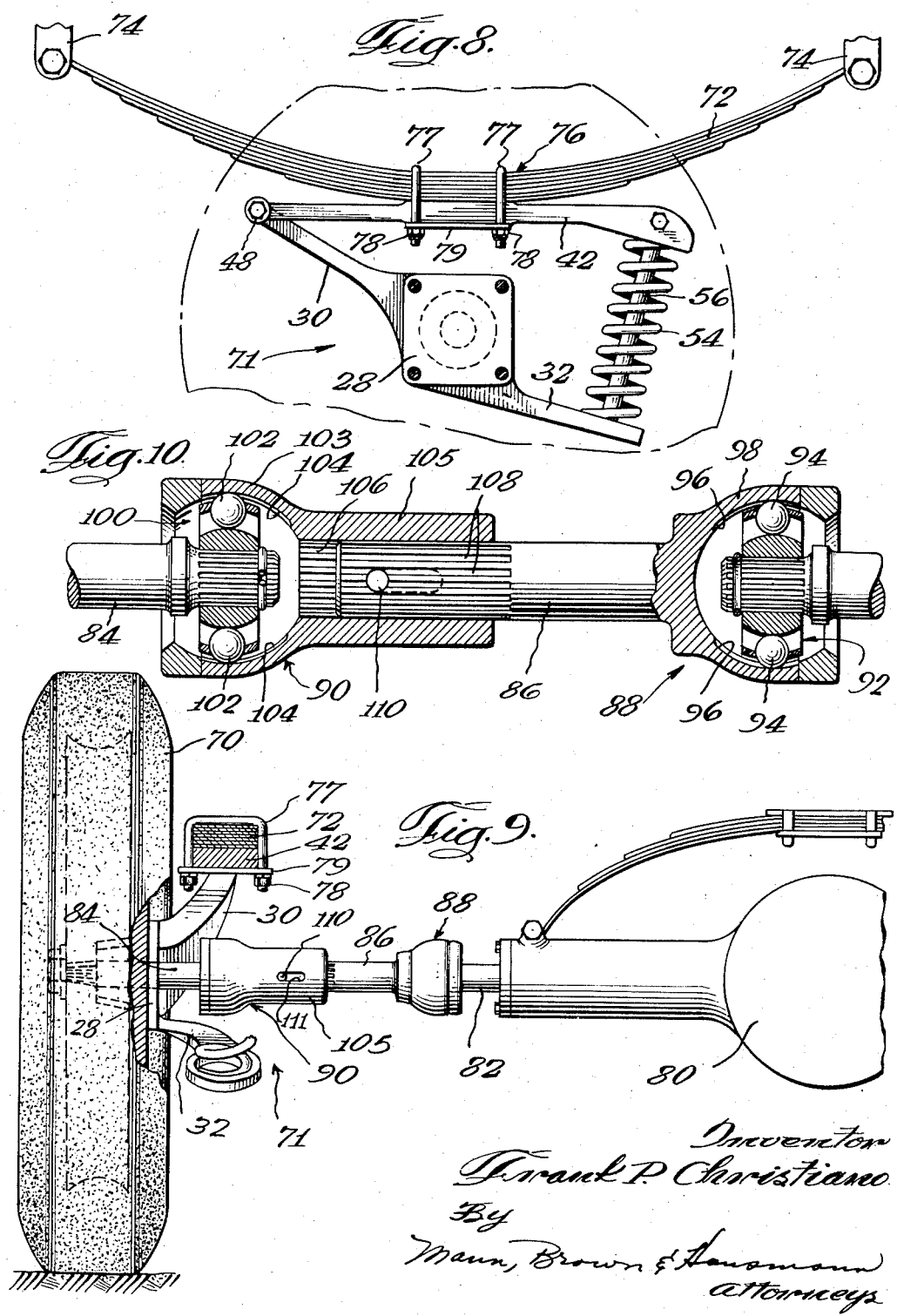

2,831,545

SWINGABLE WHEEL MOUNTING

Frank P. Christiano, Chicago, Ill.

Application December 31, 1954, Serial No. 479,150

6 Claims. (Cl. 180—73)

My invention relates to a swingable wheel mounting, and more particularly to a swingable wheel mounting for automobiles or the like that provides a swinging action in which the wheel tends to swing away from an obstruction as it encounters and moves over it.

In conventional front wheel suspension systems, the wheel is connected to the vehicle frame by upper and lower suspension arms which allow vertical movement of the wheel with respect to the frame as the wheel encounters an obstruction, which arrangement is conventionally termed "knee action." The said conventional systems include structure providing for steering of the vehicle, which allows the wheel to be pivoted about a substantially vertical axis. In rear wheel suspension systems, the wheel conventionally is fixedly mounted with respect to the vehicle frame, resilient means such as springs normally being interposed between the frame and the vehicle body.

It has been found that the vertical movement occurring in conventional front wheel suspension systems when a wheel strikes an obstruction is not sufficient to eliminate the shock transferred suddenly to the frame, with consequent strain on the connecting elements, the frame, and occupants of the vehicle. I have found that this is because the various elements connecting the individual wheels to the frame do not allow the wheel to give rearwardly of the frame when it strikes the obstruction.

Accordingly, it is a principal object of the present invention to provide a swingable wheel mounting or suspension system which allows the individual wheels to swing rearwardly of the vehicle, or the direction of travel of the vehicle, thereby reducing the shock transferred to the frame of the vehicle and the occupants thereof supported thereby with consequent reduction of stress and strain on the wheel suspension elements.

Another object of the invention is to provide a swingable mounting adapted to be incorporated in conventional knee action automobile front wheel suspension systems, to provide a swinging action in addition to the conventional knee action.

It is still another object of the invention to provide a swingable mounting for driving wheels of a vehicle, normally the rear wheels in, for instance, conventional automobiles.

Still another object of the invention is to provide a swingable wheel mounting for automobiles and the like which is economical of manufacture, capable of ready attachment to conventional vehicles without substantial modification thereof, and capable of use with substantially all types of wheeled vehicles.

Other objects, uses and advantages will be obvious or become apparent from a consideration of the following description and the drawings.

In the drawings:

Figure 1 is a plan view of a front wheel mounting or suspension system according to the present invention, with parts broken away for clarity of illustration;

Figure 2 is a view along line 2—2 of Figure 1, with the wheel removed for clarity of illustration;

Figure 3 is a sectional view along line 3—3 on a smaller scale;

Figure 4 is a view similar to Figure 3 but illustrating the action of the wheel provided by my swingable mounting;

Figure 5 is a sectional view along line 5—5 of Figure 2 with parts shown in elevation;

Figure 6 is a rear elevational view of the mounting, looking toward the front of the vehicle, with parts broken away for clarity of illustration;

Figure 7 is a perspective view of the wheel mounting plate and the rigid arms affixed thereto;

Figure 8 is a diagrammatic side elevational view of a driving wheel mounting according to the principles of my invention, for instance, the rear wheel of a conventional automobile, with the wheel removed for clarity of illustration;

Figure 9 is a rear elevational view of the mounting shown in Figure 8, as seen from the right of Figure 8; and Figure 10 is a sectional view of the driving means interposed in the conventional rear axle shaft to allow vertical movement of the driving wheel with respect to the said shaft.

Referring now to Figures 1 and 6, reference numeral 10 generally indicates a conventional vehicle frame including a side rail 12 and a front cross member 14 fixed to the side rail in the usual manner. Portions of a conventional front wheel suspension system are illustrated, including an upper suspension arm 16, operatively secured to a shock absorber 18 secured to rail 12, a lower suspension arm 20 pivoted to the cross member 14 as at 21, a coil spring 22 interposed between the lower suspension arm 20 and the cross member 14, and a compression bumper 24. The upper and lower suspension arms 16 and 20 are conventionally connected to a generally vertical steering knuckle support that carries a king pin to which the wheel is pivotally secured (the latter elements, being conventional, are not shown in the drawings). The pivotal connections between the substantially vertical steering knuckle support and the upper and lower suspension arms provide a vertical movement, termed a "knee action," when the wheel encounters an obstruction, which results in a relatively smooth ride even though the vehicle proceeds over a comparatively rough surface.

I have found that if the conventional knee action is supplemented by a swinging action, in which the wheel swings rearwardly of the obstruction in the direction of travel as it encounters it, the shocks transmitted to the frame and the strain on the wheel suspension system elements are reduced to a minimum.

A preferred embodiment of my invention providing such a swinging action is generally indicated at 26 in Figures 1, 2 and 6, wherein it will be seen that the wheel 27 is secured to a mounting plate 28 (the structure mounting the wheel on plate 28 is conventional as indicated by the dotted lines and therefore is not further illustrated or described), which plate includes a forwardly and upwardly extending arm 30 and a rearwardly and downwardly extending arm 32. Both of said arms 30 and 32 may be fixed to said mounting plate 28 in any suitable manner, though in the illustrated embodiment, they are integral with said plate. The suspension arms 16 and 20 are secured to a king pin 34 through connecting links 36 and 38 (see Figures 5 and 6), which links are pivotally connected to the arms 16 and 20 by suitable bolts 35 secured in place with nuts 37. Yoke member 38a, comprising arms 39 and 41 pivotally mounted at 40 on the side rail 12, may be pivotally connected to the lower suspension arm 20 and the connecting link 38 if so desired to strengthen the assembly. Pivotally mounted on the king pin 34 is a mounting bar 42 (see Figures 1 and 5). As shown in Figure 5, anti-friction bearings 44 separate the bar 42 from the upper link 36 and the bushing 46. The bushing 46 separates the lower bearing 44 from the connecting link 38, and the king pin is secured in place by nut 45, as shown most clearly in Figure 2. The forward end of the arm 30 is pivotally connected to the forward end of the bar 42 by a suitable means such as bolt 48 secured in place by nut 50. The rearwardly extending ends of the bar 42 and the arm 32 are formed with opposed recesses 52 and compression spring 54 is interposed between and within the said recesses. Pivotally secured to the rearward end of bar 42 is a depending rod 56 which passes through the center of spring 54 and a suitable hole in the end of arm 32; nut 60 screw-threadedly received on the end of the rod 56 limits the amount of movement possible between the rearward ends of bar 42 and arm 32.

Referring to Figures 3 and 4, the normal positions of the principal elements of my swingable mounting, with respect to each other, are indicated in Figure 3, the weight of the automobile supported by wheel 27 being transmitted thereto through the mounting bar 42. When the wheel 27 encounters an obstruction, such as the bump 62 illustrated in Figure 4, the wheel swings backwardly and upwardly from the bump about the pivotal connection of arm 30 with the mounting bar 42, thereby compressing the spring 54. After the wheel passes over the bump, the spring 54 acts to urge the wheel back to its original position. The result is that as the wheel passes over the bump, the wheel swings away from the bump, thereby absorbing most of the shock which ordinarily would be transmitted to the wheel suspension elements and the vehicle frame. The compression spring 54 thereafter smoothly restores the elements of the mounting to their original positions.

Figures 8–10 illustrate the principles of my invention as applied to the driving wheel of a vehicle, for instance, the rear wheel of a conventional automobile. As shown in Figures 8 and 9, the wheel 70 is secured by any conventional mounting means (such as that diagrammatically illustrated in dotted lines) to the mounting plate 28 of swingable mounting 71. Arms 30 and 32 fixed to the mounting plate 28 are secured to the mounting bar 42 as described above, with the spring 54 being interposed between the rearward ends of bar 42 and arm 32. Thus, the mounting plate 28 is swingable about the bolt 48 pivotally connecting the forwardly extending ends of arm 30 and bar 42. However, the bar 42 is secured to the conventional vehicle spring 72, which in turn is secured to the brackets 74 fixed to a vehicle body in any suitable manner. Suitable clamping means 76 may be employed for this purpose, said clamping means 76 being illustrated as including a pair of U-shaped bolts 77 straddling the spring 72 and the bar 42 and passing through a plate 79, with nuts 78 securing the plate 79 in place.

In conventional rear wheel drive systems, the drive is transmitted to the rear wheels by differential gears mounted in an axle housing 80 to an axle shaft 82 which conventionally is fixed to the wheel 70. In the present invention, the swingable wheel mounting permits the wheel to swing vertically of these elements, so I employ a flexible drive coupling to transmit the drive to wheel 70. As shown more particularly in Figures 9 and 10, the conventional axle shaft 82 and housing 80 are shortened somewhat, and a short shaft 84 is fixed to the wheel 70, said shaft 84 extending through the mounting plate 28 somewhat as shown in Figure 9. Interposed between the ends of shafts 82 and 84 is an intermediate shaft 86 connected to the respective ends of shafts 82 and 84 by flexible couplings 88 and 90. As shown in Figure 10, the end of shaft 82 has secured thereto antifriction means 92 including a plurality of ball bearings 94. The ball bearings 94 operate in and bear against the sides of a plurality of internal curvilinear grooves 96 in the cupped shaped portion 98 of the coupling 88, the number of ball bearings 94 and the number of grooves 96 being equal. Such an arrangement allows the shaft 86 to be disposed out of axial alignment with the shaft 82, though the motion of shaft 82 will be transmitted to the shaft 86 through the ball bearings 94. The coupling 90 at the other end of the shaft 86 is similar, the shaft 84 having antifriction means 100 fixed thereto including the ball bearings 102 which operate in curvilinear grooves 104 formed in the cupped shaped portion 103 of the coupling 90; in coupling 90, however, the sides of the grooves 104 bear against the ball bearings 94 to transmit the motion of shaft 86 to shaft 84 and the wheel 70. The coupling 90 includes a sleeve portion 105 formed with a plurality of axially extending lugs 106 adapted to slidably engage in grooves 108 formed on the end of shaft 86, and a rigid pin 110 passes through the sleeve 105 and shaft 86 to preclude separation of these two elements, the pin being held in place by suitable means such as cotter pins (not shown) at each end thereof. The pin 110 is positioned in slots 111 formed in sleeve 105. This arrangement allows the shaft 86 to slide outwardly of sleeve 105 without interfering with the transmission of torque to the shaft 84.

It will be appreciated that actuation of shaft 82 in the conventional manner will cause wheel 70 to rotate and the vehicle to which the wheel is secured will move along its supporting surface. When the wheel 70 encounters and engages a bump or other obstruction, the swinging mounting allows the wheel 70 to swing rearwardly and upwardly, and thus away from the obstruction in a manner similar to that described hereinbefore. As the wheel 70 swings upwardly and away from the obstruction, the shaft 84 moves upwardly with respect to the shaft 82 and the shaft 86 becomes inclined with respect to shafts 82 and 84; the shaft 86 therefore moves outwardly of the sleeve 105, as it must, since the wheel 70 does not move transversely of the vehicle with respect to shaft 82 as it swings about bolt 38. The flexible couplings 88 and 90, sleeve 105 and grooves 108 in shaft 86, however, allow the wheel to swing vertically and also transmit to wheel 70 the driving torque placed on the shaft 82. After the obstruction has been passed, the shafts 82, 84 and 86 become once again substantially axially aligned, and the various elements comprising the swingable mounting 71 return to substantially the positions illustrated in Figures 8 and 9.

It will be noted that in both the illustrated embodiments of the invention, the vehicle wheel in effect is secured intermediate the ends of the rigid member formed by mounting plate 28 and arms 30 and 32, which member is disposed in an inclined position with the forward upper end thereof pivoted to the mounting bar and resilient means interposed between the rearwardly extending ends of the said rigid member and mounting bar. In simplified forms of the invention the illustrated mounting bar 42 may be eliminated and the rigid member secured directly to the vehicle frame or body, with the said resilient means being interposed between said frame or body and the rear end of said rigid member.

I comprehend that the swingable mountings 26 and 71 may be used on all the wheels of an automobile or other vehicle, that is, that the swingable mountings 26 would be employed in connection with the front wheels thereof and the swingable mountings 71 would be employed in connection with the rear wheels thereof. While steering, stabilizing, and braking apparatus have not been illustrated in the drawings, I comprehend that conventional systems may be employed, in which the necessary modifications, if any, that are required can be readily accomplished by one skilled in the art.

The foregoing description and the drawings are given merely to explain and illustrate my invention, and the invention is not to be limited thereto, except insofar as the appended claims are so limited since those skilled in the art who have my disclosure before them will be able to make modifications and variations therein without departing from the scope of the invention.

I claim:

1. A swingable mounting for a vehicle front wheel comprising a king pin, means connecting said king pin to the frame, a mounting bar carried by said king pin and extending generally longitudinally of the frame, a mounting plate, means rotatably securing the wheel to said mounting plate, a forwardly extending arm fixed to said mounting plate, means for pivotally connecting the forward ends of said mounting bar and said arm, a rearwardly extending arm fixed to said plate, and resilient means interposed between the rearward ends of said mounting bar and said rearwardly extending arm, with the pivotal connection between said forward arm and said mounting bar being disposed above the center of rotation of the wheel.

2. A swingable mounting for a vehicle front wheel comprising an upper suspension arm pivoted at one end thereof to the frame and extending transversely of the frame, a lower suspension arm pivoted at one end thereof to the frame and extending transversely of the frame, a king pin connected to the other ends of said arms, a mounting bar secured to the king pin for pivotal movement about a generally vertical axis, said mounting bar extending generally longitudinally of the frame, a mounting plate, means rotatably securing the wheel to said mounting plate, a forwardly and upwardly extending arm fixed to said mounting plate, means pivotally connecting the forward end of said arm to the forward end of said mounting bar, and resilient means interposed between said mounting bar and said mounting plate.

3. In a wheel suspension system including upper and lower suspension arms pivotally connected to the vehicle frame, a king pin carried by said arms, and a wheel connected to the king pin, the improvement comprising a mounting bar carried by said king pin, said bar extending generally longitudinally of the vehicle frame, a mounting plate, means rotatably securing the wheel to the mounting plate, a forwardly and upwardly extending arm fixed to said mounting plate, with the forward end of said arm being pivotally secured to the forward end of said bar, a rearwardly extending arm fixed to said plate, and resilient means interposed between the rearwardly extending arm and the rearward end of said bar.

4. In a vehicle including a frame having a longitudinally extending side rail, a device for mounting a wheel on the frame comprising a mounting bar secured to the rail and extending generally longitudinally of the frame, a relatively flat mounting plate positioned laterally outwardly of said mounting bar and below same, said mounting plate being substantially vertically disposed, means securing the wheel to the outer side of said plate, a forwardly and upwardly extending arm fixed to said mounting plate, with the rearward end of said arm extending laterally inwardly of said mounting plate and curving into vertical alignment with the forward end of said bar, means pivotally connecting the forward end of said arm to the forward end of said bar, a rearwardly extending arm fixed to said mounting plate, with the forward end of the last mentioned arm extending laterally inwardly of said mounting plate and curving into vertical alignment with the rearward end of said bar, and resilient means interposed between the rearward end of said last mentioned arm and the rearward end of said bar.

5. The device set forth in claim 4 wherein said mounting bar is secured to a king pin secured to the rail.

6. The device set forth in claim 4 including a driven axle shaft fixed to the wheel and extending through said mounting plate, a driving axle shaft carried by the frame, an intermediate shaft interposed between the ends of said driving shaft and said driven shaft, and flexible couplings connecting the ends of said intermediate shaft to the respective ends of said driving and driven shafts.

References Cited in the file of this patent

UNITED STATES PATENTS

| | | |
|---|---|---|
| 1,069,334 | Humphrey | Aug. 5, 1913 |
| 1,242,682 | Goodrich | Oct. 9, 1917 |
| 2,105,823 | Schofield | Jan. 18, 1938 |
| 2,122,308 | Banks | June 28, 1938 |
| 2,352,446 | Pointer | June 27, 1944 |
| 2,552,987 | Loertz | May 15, 1951 |
| 2,554,261 | Munger | May 22, 1951 |